(12) United States Patent
Parkey

(10) Patent No.: US 10,278,321 B2
(45) Date of Patent: May 7, 2019

(54) HAND HELD TILLING DEVICE

(71) Applicant: Wayne Parkey, Cullman, AL (US)

(72) Inventor: Wayne Parkey, Cullman, AL (US)

( * ) Notice: Subject to any disclaimer, the term of this patent is extended or adjusted under 35 U.S.C. 154(b) by 573 days.

(21) Appl. No.: 15/040,611

(22) Filed: Feb. 10, 2016

(65) Prior Publication Data

US 2017/0223886 A1   Aug. 10, 2017

(51) Int. Cl.
*A01B 1/06* (2006.01)
*A01B 33/02* (2006.01)

(52) U.S. Cl.
CPC ............ *A01B 1/065* (2013.01); *A01B 33/027* (2013.01)

(58) Field of Classification Search
CPC ............................... A01B 1/065; A01B 33/027
USPC ...................................... 172/41, 42
See application file for complete search history.

(56) References Cited

U.S. PATENT DOCUMENTS

| | | | |
|---|---|---|---|
| 2,823,597 A * | 2/1958 | Kelsey | A01B 33/027 172/103 |
| 2,847,924 A * | 8/1958 | Quick | A01B 33/12 172/123 |
| 2,888,994 A * | 6/1959 | Hoff | A01B 33/027 172/103 |
| 3,710,870 A | 1/1973 | Pfeiffer | |
| 4,049,059 A * | 9/1977 | Weibling | A01B 33/027 172/15 |
| D252,879 S | 9/1979 | Lessig, III et al. | |
| 4,286,675 A * | 9/1981 | Tuggle | A01D 34/90 173/213 |
| 5,048,617 A | 9/1991 | Haven | |
| 5,850,882 A | 12/1998 | Link | |
| 5,960,889 A | 10/1999 | McLaren | |
| 6,382,325 B1 | 5/2002 | Bovi | |
| 6,904,976 B1 | 6/2005 | Zach et al. | |
| 7,237,620 B2 * | 7/2007 | Abenroth | A01B 33/028 172/15 |
| 2015/0034391 A1 * | 2/2015 | McLain | A01B 33/028 175/162 |

FOREIGN PATENT DOCUMENTS

WO    WO2008063509    5/2008

* cited by examiner

*Primary Examiner* — Thomas B Will
*Assistant Examiner* — Joel F. Mitchell

(57) ABSTRACT

A hand-held tilling device for powered hand-held tilling of substrate includes a support that is hollow. A drive assembly is coupled to a top end of the support. The drive assembly is configured for grasping in a hand of a user. A tillage assembly is coupled to a bottom end of the support. The tillage assembly is drivingly coupled to the drive assembly. The drive assembly is positioned on the support for grasping in the hand of the user. The drive assembly is positioned to motivate the tillage assembly to till a substrate selected by the user.

12 Claims, 5 Drawing Sheets

HAND HELD TILLING DEVICE

BACKGROUND OF THE DISCLOSURE

Field of the Disclosure

The disclosure relates to tilling devices and more particularly pertains to a new tilling device for powered hand-held tilling of substrate.

SUMMARY OF THE DISCLOSURE

An embodiment of the disclosure meets the needs presented above by generally comprising a support that is hollow. A drive assembly is coupled to a top end of the support. The drive assembly is configured for grasping in a hand of a user. A tillage assembly is coupled to a bottom end of the support. The tillage assembly is drivingly coupled to the drive assembly. The drive assembly is positioned on the support for grasping in the hand of the user. The drive assembly is positioned to motivate the tillage assembly to till a substrate selected by the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
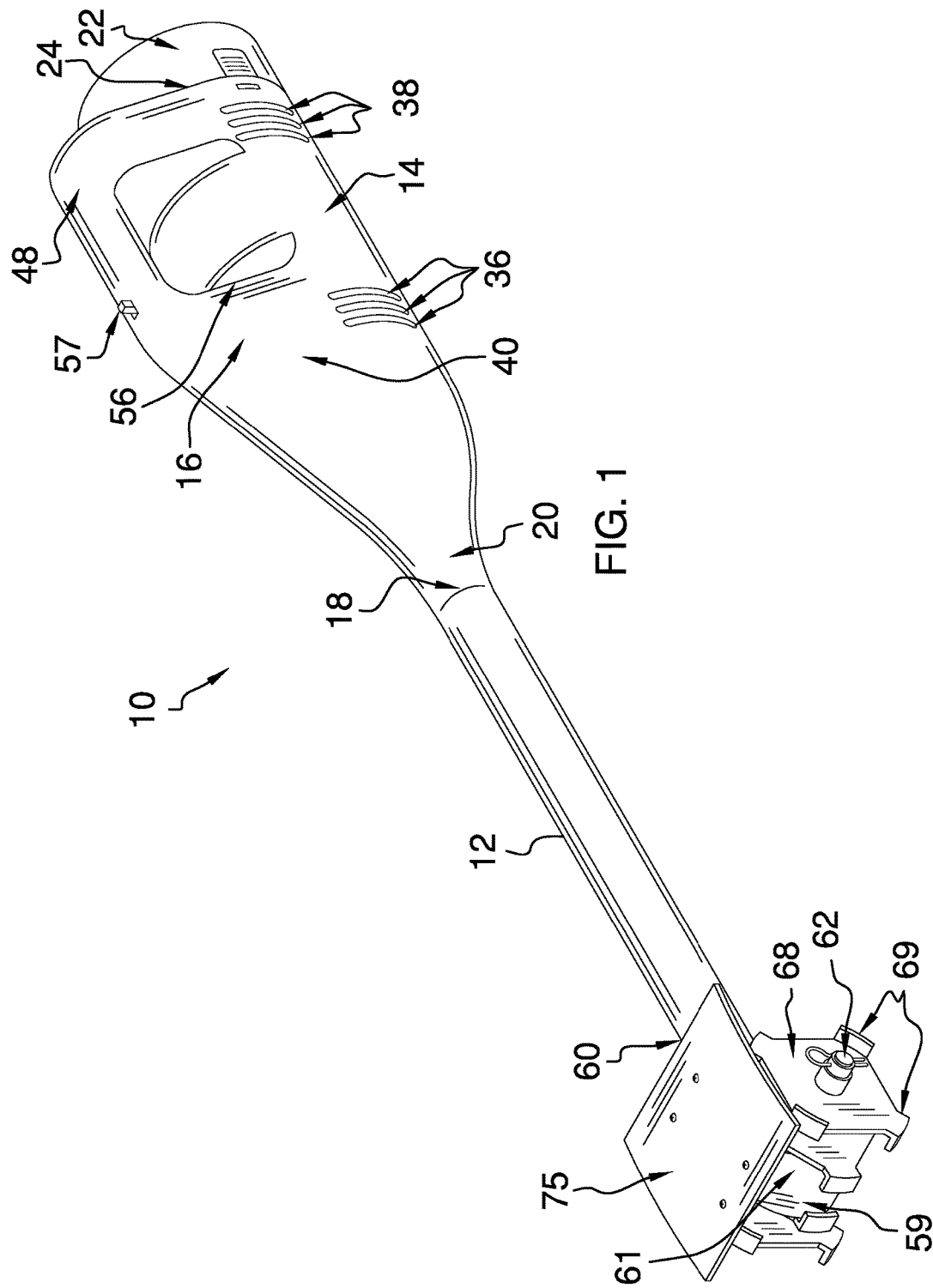
FIG. 1 is an isometric perspective view of a hand-held tilling device according to an embodiment of the disclosure.
Figure 2:
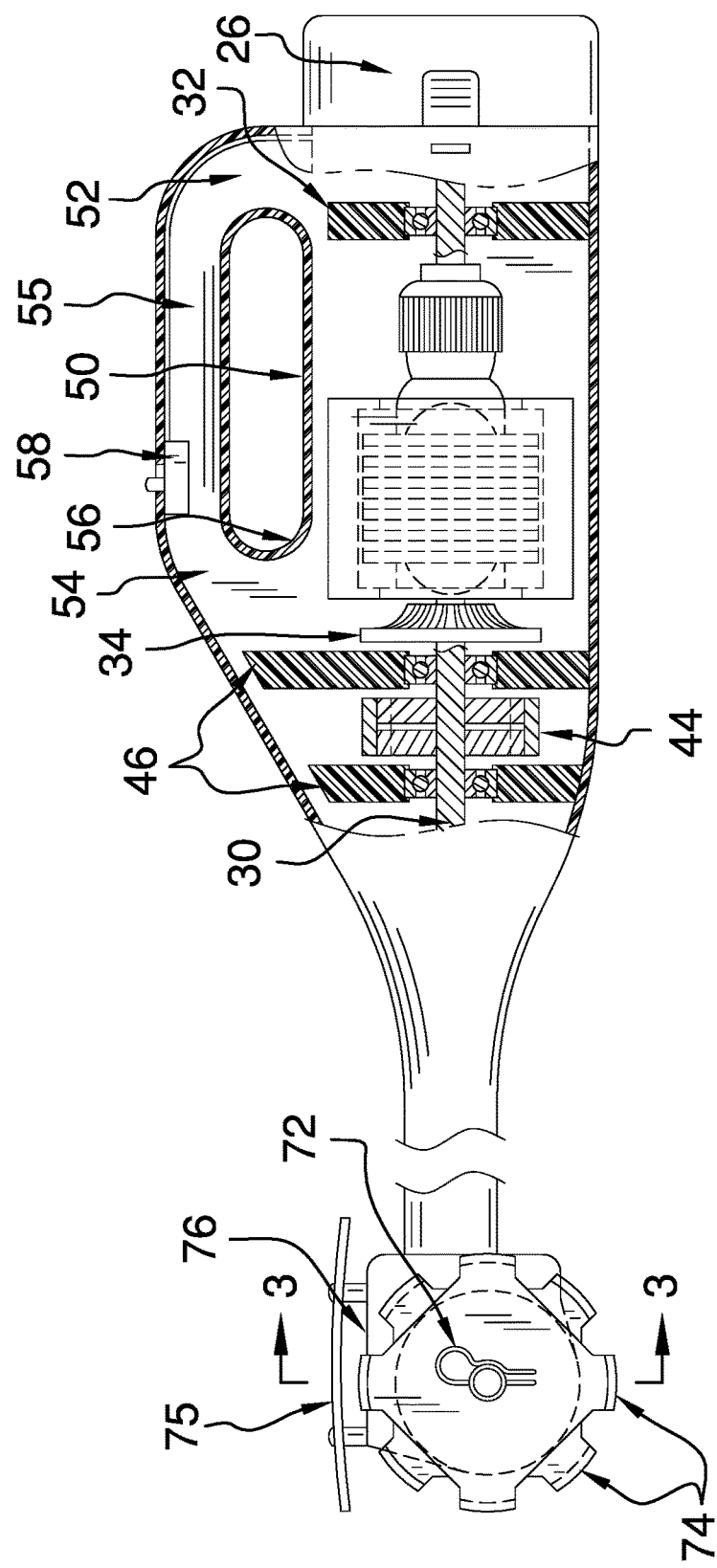
FIG. 2 is a side cross-sectional view of an embodiment of the disclosure.
Figure 3:
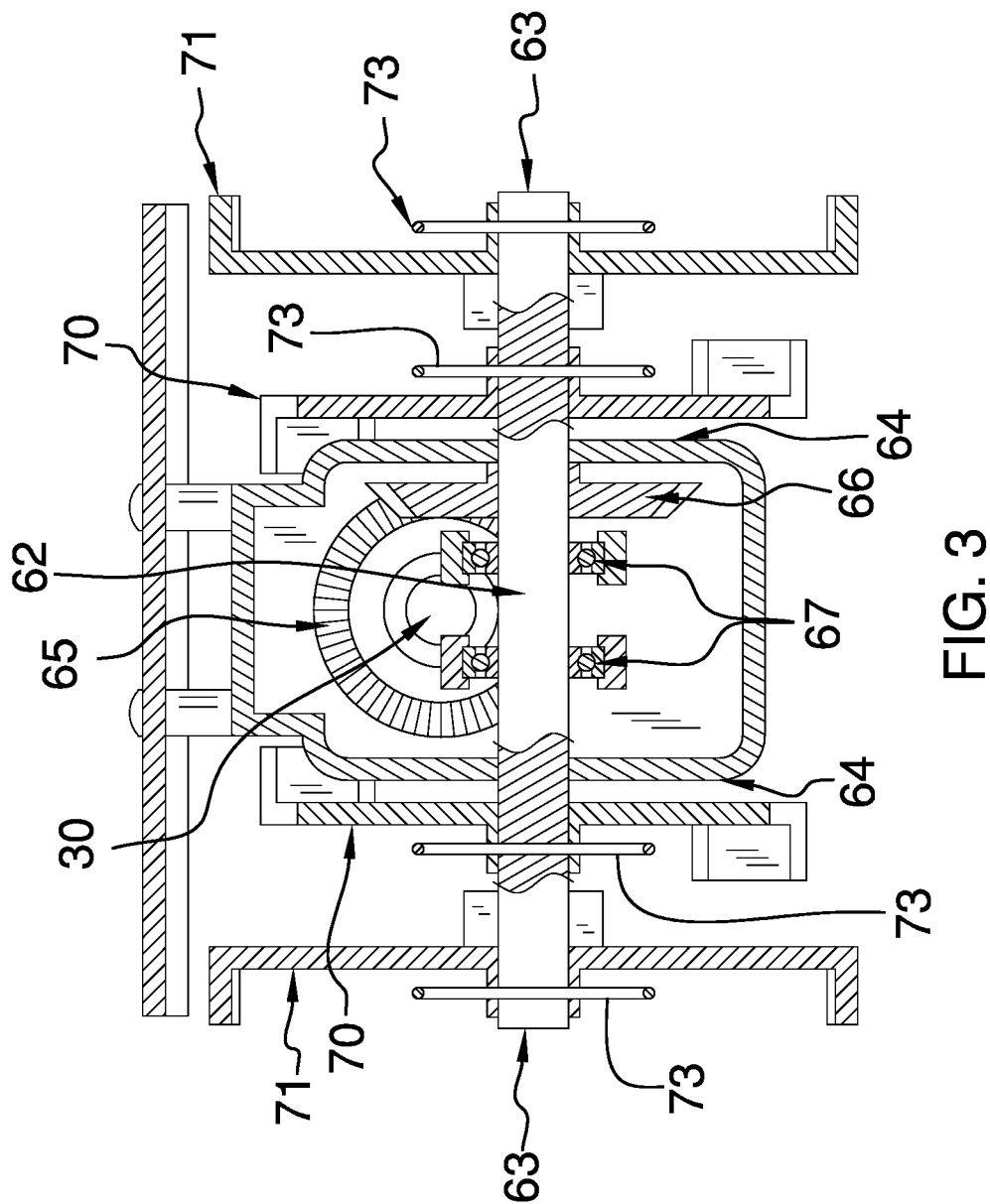
FIG. 3 is a front cross-sectional view of an embodiment of the disclosure.
Figure 4:
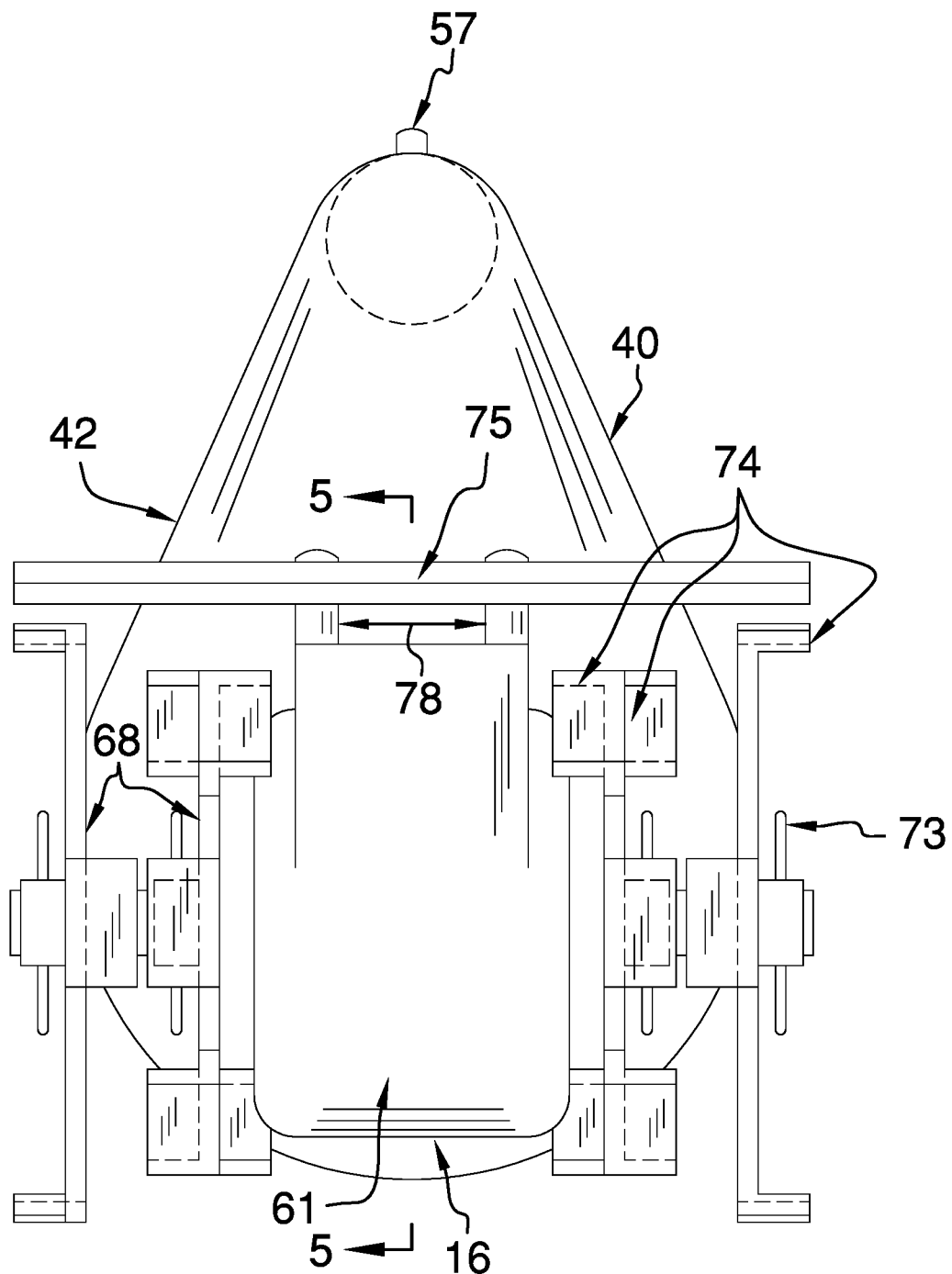
FIG. 4 is a side cross-sectional view of an embodiment of the disclosure.
Figure 5:
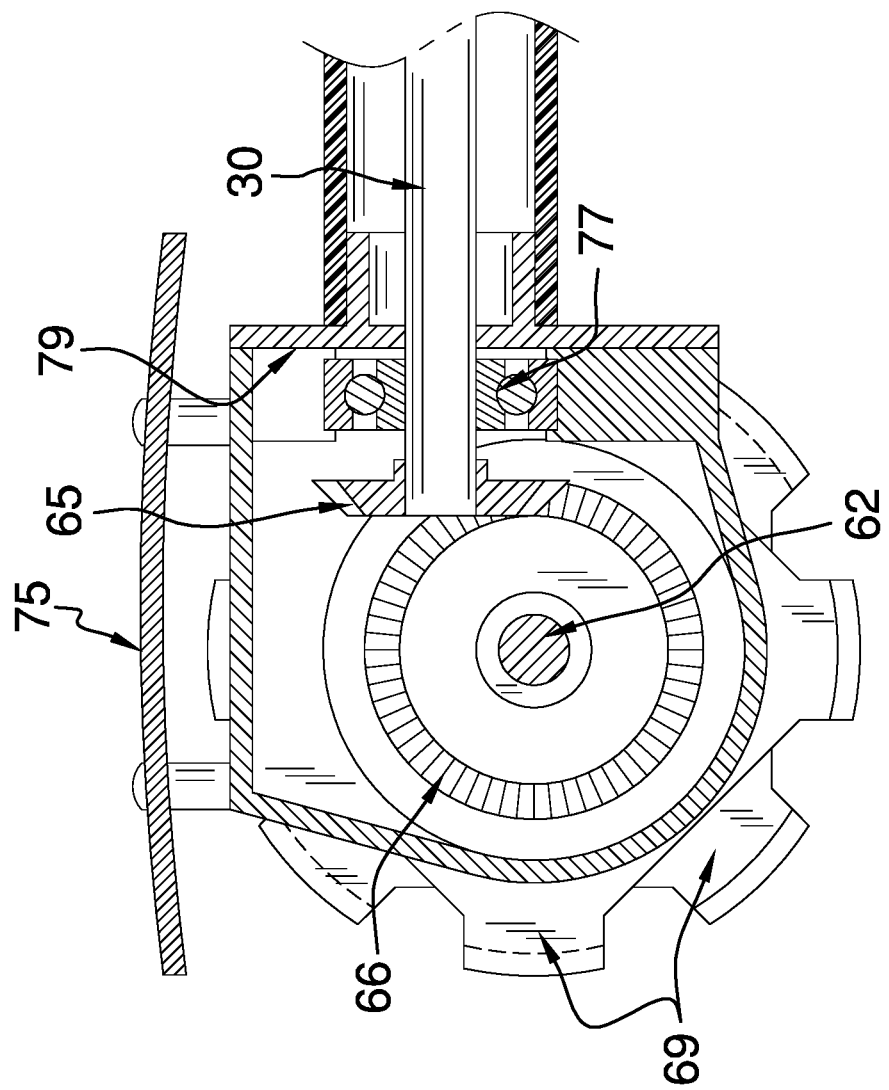
FIG. 5 is a front view of an embodiment of the disclosure.

With reference now to the drawings, and in particular to FIGS. 1 through 5 thereof, a new tilling device embodying the principles and concepts of an embodiment of the disclosure and generally designated by the reference numeral 10 will be described.

As best illustrated in FIGS. 1 through 5, the hand-held tilling device 10 generally comprises a support 12 that is hollow. The support 12 is substantially circular when viewed longitudinally. A drive assembly 14, coupled to a top end 16 of the support 12, is configured for grasping in a hand of a user. The drive assembly 14 comprises a first housing 16 that is coupled to a top end 18 of the support 12. The first housing 16 is substantially circular when viewed longitudinally. The first housing 6 has a first end 20, which is tapered, that is coupled to the support 12. A power module 22 is coupled to a second end 24 of the first housing 16. The power module 22 is detachable and preferably comprises at least one rechargeable battery 26.

A motor 28 is coupled to and positioned in the first housing 16. The motor 28 is operationally coupled to the power module 22. A shaft 30 is rotationally coupled to the motor 28. The shaft 30 extends from the motor 28 through the support 12. A first bearing 32 is coupled to the first housing 16 and is positioned around the shaft 30 between the motor 28 and the power module 22. The first bearing 32 is sealed and lubricated.

A fan 34 is coupled to the shaft 30 proximate to the motor 28. Each of a plurality of first slots 36 is positioned through the first housing 16 proximate to the first end 20. Each of a plurality of second slots 38 is positioned through the first housing 16 proximate to the second end 24. The fan 34 is positioned to draw air through the first slots 36 such that air passes over the motor 28 and out the second slots 38, therein cooling the motor 28. Preferably, the plurality of first slots 36 comprises three first slots 36 positioned on a left side 40 and three first slots 36 positioned on a right side 42 of the first housing 16. Also preferably, the plurality of second slots 38 comprises three second slots 38 positioned on the left side 40 and three second slots 38 positioned on the right side 42 of the first housing 16. The first slots 36 and the second slots 38 are substantially rectangularly shaped.

A gear set 44 is positioned in the first housing 16 proximate to the first end 20. The gear set 44 is operationally coupled to the shaft 30, such that the gear set 44 is positioned to reduce the rotational rate of the shaft 30 relative to the output speed of the motor 28. The gear set 44 is positioned between a pair of second bearings 46. The second bearings 46 are coupled to the first housing 16 and are positioned around the shaft 30. The second bearings 46 are sealed and lubricated.

A handle 48 is coupled to a top face 50 of the first housing 6. The handle 48 comprises a rear section 52, a front section 54 and a center section 55. The rear section 52 extends upwardly from the top face 50 proximate to the second end 24. The front section 54 extends upwardly from the top face 50 proximate to a midpoint 56 of the top face 50. The center section 55 is coupled to and extends between the rear section 53 and the front section 54. The center section 55 is in substantial parallelism with the support 12. Preferably, the center section 55 is substantially circular when viewed longitudinally.

A control panel 57 is coupled to the handle 48, preferably to the center section 55 of the handle 48. The control panel 57 is operationally coupled to the motor 28, such that the control panel 57 is positioned to control the motor 28. Preferably, the control panel 57 comprises an On/Off switch 58.

A tillage assembly 59 is coupled to a bottom end 60 of the support. The tillage assembly 59 is drivingly coupled to the drive assembly 14. The tillage assembly 59 comprises a second housing 61 that is coupled to the bottom end 60 of the support 12. The second housing 61 is substantially rectangularly box shaped. An axle 62 that has opposing ends 63 is operationally coupled to the shaft 30. Each opposing end 63 extends through a respective opposing side 64 of the second housing 61.

A drive gear 65 is positioned in the second housing 61. The drive gear 65 is axially coupled to the shaft 30. A tine gear 66 is coupled to the axle 62. The tine gear 66 is gearedly coupled to the drive gear 65. A pair of third bearings 67 is coupled to the second housing 61. The third bearings 67 are positioned around the axle 62. The third bearings 67 are sealed and lubricated. A fourth bearing 77 is coupled to the second housing 61. The fourth bearing 77 is positioned around the shaft 30 between the drive gear 65 and a back wall 79 of the second housing 61. The fourth bearing 77 is sealed and lubricated.

Each of a plurality of plates 68 is coupled to the axle 62 proximate to a respective opposing end 63. The plate 68 is positioned outside of the second housing 61. The plates 68 are substantially squarely shaped, such that each plate 68 has four corners 69. Preferably, the plurality of plates 68 comprises a pair of inner plates 70 and a pair of outer plates 71. Each inner plate 70 is positioned proximate to a respective opposing side 64 of the second housing 61. Each outer plate 71 is positioned between an associated inner plate 70 and a respective opposing end 63 of the axle 62. The inner plates 70 and the outer plates 71 are coupled to the axle 62 such that a respective inner plate 70 is rotated forty five degrees relative to an associated outer plate 71. Preferably, the outer plates 71 are dimensionally larger that the inner plates 70.

Each of a plurality of fasteners 72 is coupled to a respective plate 68 and the axle 62, such that the respective plate 68 rotates coincidentally with the axle 62. Preferably, the fasteners 72 comprise cotter pins 73.

The device 10 also comprises a plurality of tines 74. The tines 74 are coupled singly to each of the corners 69 of the plates 68. Each tine 74 extends transversely from a respective plate 68, such that the tines 74 are positioned to engage the substrate as the axle 62 rotates. Preferably, each tine 74 is positioned in opposition to respective tines 74 positioned on adjacent corners 69.

A shield 75 is coupled to a top surface 76 of the second housing 61. The shield 75 is configured to deflect substrate propelled by the tines 74 away from the user. The shield 75 is dimensionally larger than the top surface 76, such that the shield 75 extends past each the outer plate 71. Preferably, the shield 75 is arcuate.

A plurality of extenders 78 may be coupled to and extend transversely from the top surface 76. The shield 75 is screwedly coupled to each extender 78 distal from the top surface 76, such that the shield 75 is elevated above the top surface 76. Preferably, the plurality of extenders 78 comprises four extenders 78.

Preferably, the support 12, the first housing 16 and the second housing 61 comprise impact resistant plastic.

In use, the handle 48 is positioned on the first housing 16 for grasping in the hand of the user. The motor 28 is positioned to rotate the shaft 30, such that the drive gear 65 rotates the tine gear 66 and the axle 62 to which it is attached. The tines 74 rotate along with the axle 62 to till a substrate selected by the user. The shield 75 is positioned on the top surface 76 of the second housing 61, such that substrate displaced by the tines 74 is directed away from the user.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hand-held tilling device comprising:
a support, said support being hollow;
a drive assembly, said drive assembly being coupled to a top end of said support, wherein said drive assembly is configured for grasping in a hand of a user,
said drive assembly comprising
a first housing, said first housing being coupled to said top end of said support, said first housing having a first end, said first end being tapered, said first end being coupled to said support,
a power module, said power module being coupled to a second end of said first housing, said power module being detachable, said power module comprising at least one rechargeable battery,
a motor, said motor being coupled to and positioned in said first housing, said motor being operationally coupled to said power module,
a shaft, said shaft being rotationally coupled to said motor, said shaft extending from said motor through said support,
a handle, said handle being coupled to a top face of said first housing, said handle comprising:
a rear section extending upwardly from said top face proximate to said second end,
a front section extending upwardly from said top face proximate to a midpoint of said top face, and
a center section, said center section being coupled to and extending between said rear section and said front section, said center section being in substantial parallelism with said support,
a control panel, said control panel being coupled to said handle, said control panel being operationally coupled to said motor, wherein said control panel is positioned to control said motor, said control panel being coupled to said center section of said handle,
a first bearing, said first bearing being coupled to said first housing, said first bearing being positioned around said shaft and between said motor and said power module, said first bearing being sealed and lubricated,
a fan, said fan being coupled to said shaft proximate to said motor,
a plurality of first slots, said firsts slot being positioned through said first housing proximate to said first end, and
a plurality of second slots, said second slots being positioned through said first housing proximate to said second end, wherein said fan is positioned to draw air through said first slots such that air passes over said motor and out said second slots therein cooling said motor;
a tillage assembly, said tillage assembly being coupled to a bottom end of said support, said tillage assembly being drivingly coupled to said drive assembly, said tillage assembly comprising a second housing, said second housing being coupled to said bottom end of said support, said second housing being substantially rectangularly box shaped, an axle, said axle being operationally coupled to said shaft, said axle having opposing ends, each said opposing end extending through a respective opposing side of said second housing, a plurality of plates, each said plate being coupled to said axle proximate to a respective said opposing end, such that said plate is positioned outside of said second housing, said plates being substantially squarely shaped, such that each said plate has four corners, a plurality of fasteners, each said fastener being coupled to a respective said plate and said axle, such that said respective said plate rotates coincidentally with said axle, said fasteners comprising cotter pins, a plurality of tines, said tines being coupled singly to each of said corners of said plates, each said tine extending transversely from a respective said plate, wherein said tines are positioned to engage the substrate as said axle rotates, a shield, said shield being coupled to a top surface of said second housing, wherein said shield is configured to deflect substrate propelled by said tines away from the user, a drive gear, said drive gear being positioned in said second housing, said drive gear being axially coupled to said shaft, a fourth bearing, said fourth bearing being coupled to said second housing, said fourth bearing being positioned around said shaft between said drive gear and a back wall of said second housing, said fourth bearing being sealed and lubricated, a tine gear, said tine gear being coupled to said axle, said tine gear being geardly coupled to said drive gear; and a pair of third bearings, said third bearings being coupled to said second housing, said third bearings being positioned around said axle, said third bearings being sealed and lubricated; and wherein said drive assembly is positioned on said support for grasping in the hand of the user, wherein said drive assembly is positioned to motivate said tillage assembly to till a substrate selected by the user.

2. The device of claim 1, further comprising:

said plurality of first slots comprising three first slots positioned on a left side and three first slots positioned on a right side of said first housing;

said plurality of second slots comprising three second slots positioned on a left side and three second slots positioned on a right side of said first housing; and said first slots and said second slots being substantially rectangularly shaped.

3. The device of claim 1, further including a gear set, said gear set being positioned in said first housing proximate to said first end, said gear set being operationally coupled to said shaft, said gear set being positioned between a pair of second bearings, said second bearings being coupled to said first housing, said second bearings being positioned around said shaft, said second bearings being sealed and lubricated, wherein said gear set is positioned to reduce the rotational rate of said shaft relative to the output speed of said motor.

4. The device of claim 1, further including said support, said first housing and said center section being substantially circular when viewed longitudinally.

5. The device of claim 1, further including said control panel comprising an On/Off switch.

6. The device of claim 1, further including said plurality of plates comprising a pair of inner plates and a pair of outer plates, each said inner plate being positioned proximate to a respective said opposing side of said second housing, each said outer plate being positioned between an associated said inner plate and a respective said opposing end of said axle.

7. The device of claim 6, further including said inner plates and said outer plates being coupled to said axle such that a respective said inner plate is rotated forty five degrees relative to an associated said outer plate, said outer plate being dimensionally larger that said inner plate.

8. The device of claim 1, further including each said tine being positioned in opposition to respective said tines positioned on adjacent said corners.

9. The device of claim 1, further including said shield being dimensionally larger than said top surface, such that said shield extends past each said outer plate, said shield being arcuate.

10. The device of claim 9, further including a plurality of extenders, said extenders being coupled to and extending transversely from said top surface, said shield being screwedly coupled to each said extender distal from said top surface, wherein said shield is elevated above said top surface, said plurality of extenders comprising four said extenders.

11. The device of claim 1, further including said support, said first housing and said second housing comprising impact resistant plastic.

12. A hand-held tilling device comprising:

a support, said support being hollow, said support being substantially circular when viewed longitudinally;

a drive assembly, said drive assembly being coupled to a top end of said support, wherein said drive assembly is configured for grasping in a hand of a user;

said drive assembly comprising:

a first housing, said first housing being coupled to said top end of said support, said first housing being substantially circular when viewed longitudinally, said first housing having a first end, said first end being tapered, said first end being coupled to said support, a power module, said power module being coupled to a second end of said first housing, said power module being detachable, said power module comprising at least one rechargeable battery, a motor, said motor being coupled to and positioned in said first housing, said motor being operationally coupled to said power module, a shaft, said shaft being rotationally coupled to said motor, said shaft extending from said motor through said support, a first bearing, said first bearing being coupled to said first housing, said first bearing being positioned around said shaft and between said motor and said power module, said first bearing being sealed and lubricated, a fan, said fan being coupled to said shaft proximate to said motor, a plurality of first slots, said first slots being positioned through said first housing proximate to said first end, a plurality of second slots, said second slots being positioned through said first housing proximate to said second end, wherein said fan is positioned to draw air through said first slots such that air passes over said motor and out said second slots therein cooling said motor, said plurality of first slots comprising three first slots positioned on a left side and three first slots positioned on a right side of said first housing, said plurality of second slots comprising three second slots positioned on a left side and three second slots positioned on a right side of said first housing, said first slots and said second slots being substantially rectangularly shaped, a gear set, said gear set being positioned in said first housing proximate to said first end, said gear set being operationally coupled to said shaft, wherein said gear set is positioned to reduce the rotational rate of said shaft relative to the output speed of said motor, said gear set being positioned between a pair of second bearings, said second bearings being coupled to said first housing, said second bearings being positioned around said shaft, said second bearings being sealed and lubricated, a handle, said handle being coupled to a top face of said first housing; said handle comprising:
 a rear section extending upwardly from said top face proximate to said second end,
 a front section extending upwardly from said top face proximate to a midpoint of said top face, and
 a center section, said center section being coupled to and extending between said rear section and said front section, said center section being in substantial parallelism with said support, said center section being substantially circular when viewed longitudinally, and a control panel, said control panel being coupled to said handle, said control panel being coupled to said center section of said handle, said control panel being operationally coupled to said motor, wherein said control panel is positioned to control said motor, said control panel comprising an On/Off switch;

a tillage assembly, said tillage assembly being coupled to a bottom end of said support, said tillage assembly being drivingly coupled to said drive assembly;

said tillage assembly comprising:
 a second housing, said second housing being coupled to said bottom end of said support, said second housing being substantially rectangularly box shaped,
 an axle, said axle being operationally coupled to said shaft, said axle having opposing ends, each said opposing end extending through a respective opposing side of said second housing,
 a drive gear, said drive gear being positioned in said second housing, said drive gear being axially coupled to said shaft,
 a fourth bearing, said fourth bearing being coupled to said second housing, said fourth bearing being positioned around said shaft between said drive gear and a back wall of said second housing, said fourth bearing being sealed and lubricated,
 a tine gear, said tine gear being coupled to said axle, said tine gear being gearedly coupled to said drive gear,
 a pair of third bearings, said third bearings being coupled to said second housing, said third bearings being positioned around said axle, said third bearings being sealed and lubricated,
 a plurality of plates, each said plate being coupled to said axle proximate to a respective said opposing end, such that said plate is positioned outside of said second housing, said plates being substantially squarely shaped, such that each said plate has four corners, said plurality of plates comprising a pair of inner plates and a pair of outer plates, each said inner plate being positioned proximate to a respective said opposing side of said second housing, each said outer plate being positioned between an associated said inner plate and a respective said opposing end of said axle, said inner plates and said outer plates being coupled to said axle such that a respective said inner plate is rotated forty five degrees relative to an associated said outer plate, said outer plate being dimensionally larger that said inner plate,
 a plurality of fasteners, each said fastener being coupled to a respective said plate and said axle, such that said respective said plate rotates coincidentally with said axle, said fasteners comprising cotter pins,
 a plurality of tines, said tines being coupled singly to each of said corners of said plates, each said tine extending transversely from a respective said plate, wherein said tines are positioned to engage the substrate as said axle rotates, each said tine being positioned in opposition to respective said tines positioned on adjacent said corners,
 a shield, said shield being coupled to a top surface of said second housing, wherein said shield is configured to deflect substrate propelled by said tines away from the user, said shield being dimensionally larger than said top surface, such that said shield extends past each said outer plate, said shield being arcuate, and
 a plurality of extenders, said extenders being coupled to and extending transversely from said top surface, said shield being screwedly coupled to each said extender distal from said top surface, wherein said shield is elevated above said top surface, said plurality of extenders comprising four said extenders;

said support, said first housing and said second housing comprising impact resistant plastic; and wherein said handle is positioned on said first housing for grasping in the hand of the user, wherein said motor is positioned to rotate said shaft, such that said drive gear rotates said tine gear and said axle to which it is attached, wherein said tines rotate along with said axle to till a substrate selected by the user, and wherein said shield is positioned on said top surface of said second housing, such that substrate displaced by said tines is directed away from the user.

\* \* \* \* \*